United States Patent
Schweid

(10) Patent No.: US 6,449,389 B1
(45) Date of Patent: Sep. 10, 2002

(54) METHOD AND APPARATUS FOR SINGLE CHANNEL COLOR IMAGE SEGMENTATION USING LOCAL CONTEXT BASED ADAPTIVE WEIGHTING

(75) Inventor: Stuart A. Schweid, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/405,927

(22) Filed: Sep. 24, 1999

(51) Int. Cl.[7] ............................................. G06K 9/00
(52) U.S. Cl. ............................................. 382/164; 382/167
(58) Field of Search .................... 382/164, 167, 382/173, 174, 162, 199; 345/593, 603, 600, 604; 358/515, 518; 348/598, 655, 676, 711, 600

(56) References Cited

U.S. PATENT DOCUMENTS

| | | | |
|---|---|---|---|
| 5,293,430 A | | 3/1994 | Shiau et al. ................. 382/173 |
| 5,327,262 A | | 7/1994 | Williams ..................... 358/462 |
| 5,331,442 A | * | 7/1994 | Sorimachi .................... 358/462 |
| 5,341,226 A | | 8/1994 | Shiau ......................... 358/518 |
| 5,394,195 A | * | 2/1995 | Herman ....................... 348/675 |
| 5,767,978 A | | 6/1998 | Revankar et al. ............ 358/296 |
| 5,768,412 A | * | 6/1998 | Mitsuyama et al. ........ 382/133 |
| 5,802,203 A | | 9/1998 | Black et al. ................. 382/173 |
| 6,343,146 B1 | * | 1/2002 | Tsuruoka et al. ........... 382/163 |

\* cited by examiner

Primary Examiner—Amelia M. Au
Assistant Examiner—Colin LaRose
(74) Attorney, Agent, or Firm—Fay, Sharpe, Fagan, Minnich & McKee, LLP

(57) ABSTRACT

A method and apparatus for single channel color image segmentation using local context based adaptive weighting is provided. The varying weightings of the projection vector are determined as a function of local input image activity context. A Sobel operator is used to calculate the input image activity. A binary map is created for each color channel and is adapted to store binary markers indicative of local activity levels on a per pixel basis. The binary maps are low pass filtered and then normalized to generate a context based adaptive weighting vector for use in single color segmentation of a multi-channel color image signal.

20 Claims, 3 Drawing Sheets

METHOD AND APPARATUS FOR SINGLE CHANNEL COLOR IMAGE SEGMENTATION USING LOCAL CONTEXT BASED ADAPTIVE WEIGHTING

BACKGROUND OF THE INVENTION

The present invention is directed to the art of digital image processing and, more particularly, to a method and apparatus for generating a context based adaptive weighting vector for use in single color segmentation of an RGB color image and will be described with particular reference thereto. However, it is to be understood that the present invention has broader application in many fields such as in generating a context based adaptive weighting vector for use in single channel segmentation of a wide variety of digital images and other digital information or data.

Segmentation plays an important role in the art of electronic image processing. Generally, segmentation is used to group pixels into regions to determine the composition of the image. Oftentimes, the various regions are used to separate the objects from the background in the image.

A wide range of segmentation algorithms and techniques have been proposed for generating a single segmentation channel from multiple channels derived from a digital image source in both academic and industrial settings. As an example, some simple algorithms use the chrominance information of the image for segmentation. Other techniques employ much more complicated methods and are, accordingly, costly to implement.

In many instances, however, a multi-channel digital image input signal is converted to a single segmentation channel using a simple fixed weighting algorithm or a fixed weight projection vector. The use of projection is one of the most common methods for creating a single channel from multiple channels. In projection, an inner product is calculated between the input video and a single predetermined direction. The single predetermined direction is essentially defined by the projection vector.

FIG. 1 is a diagrammatical illustration showing a prior art example of a segmentation system 10 for converting multiple digital image input channels 14, 16, and 18 to a single segmentation channel 22 using a fixed weighting or projection vector 20. As shown there, the digital input image is by way of example an RGB color image 12 including a red channel video signal 14, a green channel video signal 16, and a blue channel video signal 18. Each of the video signals, of course, is comprised of a plurality of image pixels that store values representative of an intensity or "amount" of red, green, and blue color intensity in the color image 12.

As noted above, in segmentation by projection, an inner product is determined between the input video channels and a single predetermined direction or projection vector. In the example shown in FIG. 1, the composite video value $V_{in}$ of each pixel in the RGB color image 12 can be represented by $V_{in}=[R_{in}\ G_{in}\ B_{in}]'$ where $R_{in}$, $G_{in}$, and $B_{in}$ represent a two-dimensional array of pixel values forming the digital image at each of the red, green, and blue image input channels 14, 16, and 18, respectively. The video value of each pixel of the segmentation channel 22 is determined from $S_y=W'*V_{in}$ where W is a weighting vector $W=[W_1\ W_2\ W_3]'$. Typically, in order to ensure that the output is limited eight bits when the input vectors are eight bit representations, the weighting vector is usually normalized by $\Sigma_i W_i = 1$.

To give a hard example of the above algorithm used in the exemplary prior art segmentation system 10 shown in FIG. 1, the weighting vector W can be the transformation from RGB to Y space and take on the value of $W=[0.253\ 0.684\ 0.063]'$. Alternatively, the weighting vector W can be selected to be the simple projection vector $W=[0\ 1\ 0]'$. In the latter example, only a single channel (the green channel for an RGB image) of the three channel input image signal is projected into Y space by the inner product as the segmentation channel 22.

The above fixed weight method of projection works well on average with many documents because the fixed projection vector weights are carefully selected from a large representative digital image experience base. However, the segmentation by projection technique is susceptible to a major failure mode because variations in the image that are orthogonal to a chosen direction cannot be detected. As an example, if the original image is comprised of green halftones formed by alternating white and green areas arranged on a page, and if the segmentation channel is chosen as a projection of the image onto green, the result will show an absence of variation in the segmentation channel. In the projection, both white and green have the same green value. In that sense, the projection vector $W=[0\ 1\ 0]'$ points in a direction that contains no change i.e. the green channel. This is a major shortcoming because in segmentation, the goal is to find change in the digital image input signal. Generally, the most accurate segmentation is derived from directions in the input signal having the most activity.

Alternatives to the above approach have been suggested including the use of modified sets of fixed values in the weighting vector. However, the above problem remains. As an example, if the weighting vector is selected as $W=[\frac{1}{3}\ \frac{1}{3}\ \frac{1}{3}]'$, then the variations in single color halftones are only $\frac{1}{3}$ that of grey halftones. This wide range of variations makes halftone/color text detection difficult with only a single set of fixed segmentation parameters.

It would therefore be desirable to provide a system that is an improvement over fixed weighting type segmentation schemes used in the prior art.

It would further be desirable to provide a method and apparatus that project multiple input image channels into a single segmentation channel using a weighting vector having dynamic adjustable weighting parameters.

It would further be desirable to provide a method and apparatus for single channel color image segmentation using local context based adaptive weighting. More particularly, preferably, the varying weightings of the projection vector are determined as a function of local context input image activity. In that way, the projection vector will always point in a direction in the input image having the greatest level of activity or change. This has the advantage of providing larger signal variation in all types of color images thus increasing correct detection of halftones and text and improving the overall performance of segmentation.

SUMMARY OF THE INVENTION

In accordance with the invention, there is provided a method and apparatus for single channel color image segmentation using local context based adaptive weighting. An adaptive weighting vector is generated and applied to each pixel of a multi-channel color input image to generate a single segmentation channel from the plurality of color separation channels forming the input image. The adaptive weighting vector includes dynamically adjustable weighting parameters that vary as a function of local context activity in the input image and, therefore, always points to a direction in the input image having the greatest level of activity or change. This has the advantage of providing larger signal variation in all types of color images thus enhancing correct detection of halftones and text while improving the overall performance of segmentation.

The subject segmentation system obtains activity estimate representations of a measure of local channel signal variation at each color channel of the input image. For each pixel (i,k) of the image, the activity estimate representations of each color channel are compared relative to each other to identify a one of the multiple channels as having the greatest activity. A set of binary maps are generated for each of the channels in the input image for storing a first binary value for pixel locations where the greatest activity in the input image is found and for storing a second binary value for those pixel locations where the input channels did not have the greatest activity. The binary maps are filtered and stored in a corresponding set of filtered channel binary maps. An adaptive weighting vector is generated by combining the plurality of binary filtered maps according to a predetermined algorithm so that the weighting vector changes rapidly for projection of the input image into a single channel without loss of information.

It is a primary object of the invention to provide a system for generating an adaptive weighting vector W(i,k) by combining a plurality of low pass filtered binary maps representative of local context activity levels in each of the image channels so that the input image is projected onto a single segmentation channel using a rapidly changing projection vector for optimizing the segmentation and thus enhancing the accuracy of subsequent image object classification.

These and other objects, advantages, and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
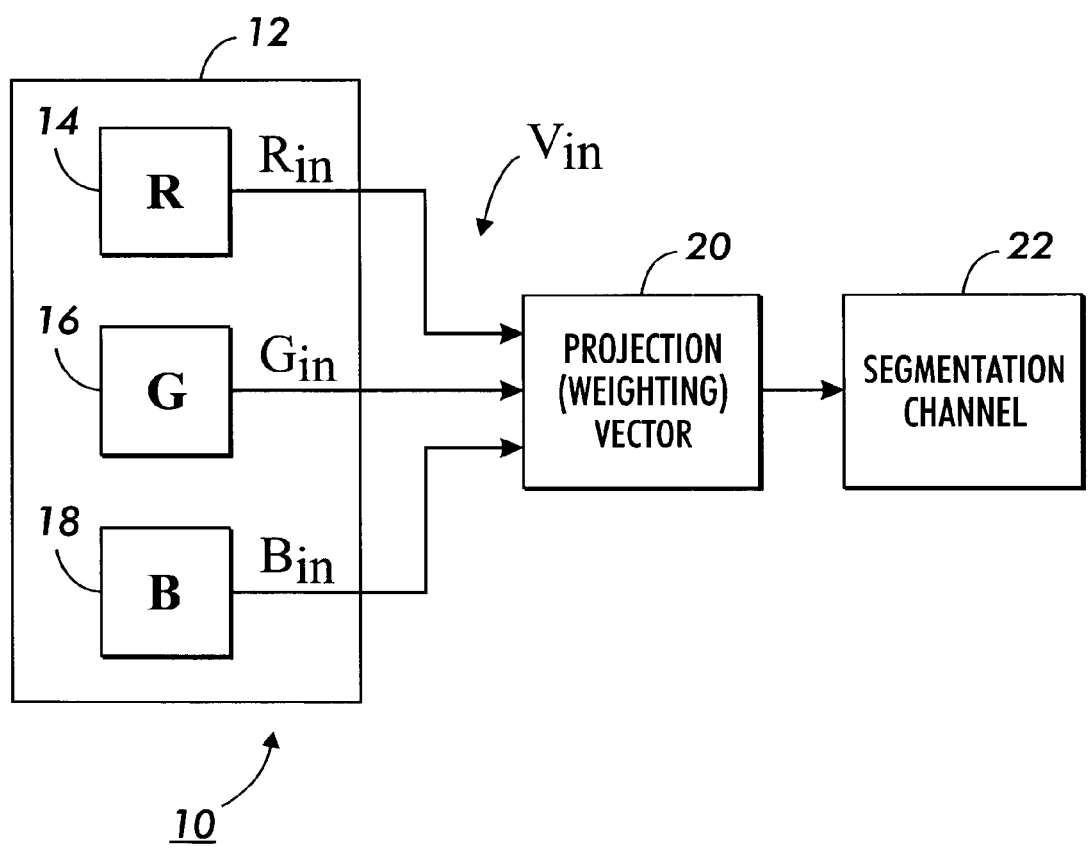
FIG. 1 is a diagrammatic illustration of a prior art single channel segmentation system.
Figure 2:
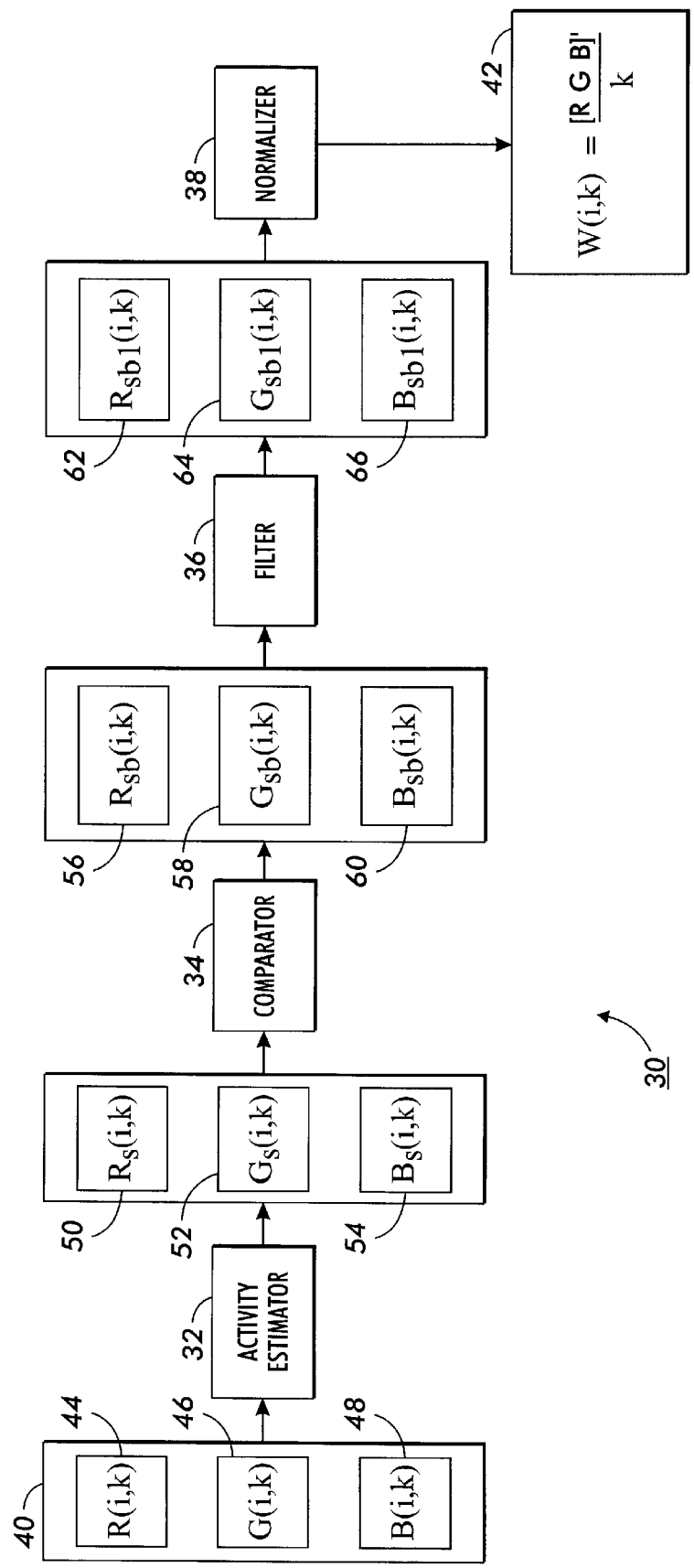
FIG. 2 is a diagrammatic illustration of a preferred segmentation system formed in accordance with the present invention; and, FIG. 3 is a flow chart showing the preferred steps for generating a context based adaptive weighting vector in accordance with the invention.

Referring now to the drawings wherein the showings are for the purposes of illustrating the preferred embodiment of the invention only and not for purposes of limiting same, FIG. 2 is a diagrammatic illustration of a segmentation system 30 formed in accordance with the present invention. As shown there, the subject segmentation system 30 includes an activity estimator circuit 32, a comparator circuit 34, a filter circuit 36, and a normalizer circuit 38. The above-noted circuits are adapted to operate in succession on each of the video channels of a digital multi-channel image 40 to generate a context sensitive adaptive weighting vector 42 in accordance with the present invention.

Generally, the digital input image 40 can be of any variety, format, or commercial standard and can include many digital channels. However, for the purposes of describing the preferred embodiment of the present invention only and not for purposes of limiting same, the subject segmentation system and method will be described in connection with an RGB digital input image including red, green, and blue video channels. The red input video consists essentially of a set of red channel pixels R(i,k) stored in a first channel buffer 44. Similarly, the green and blue input video channels include a set of green and blue channel pixels G(i,k) and B(i,k) stored in a respective set of second and third channel buffers 46, 48.

In accordance with the present invention, an activity estimator circuit 32 is adapted to provide a measurement of the local variation in each of the red, green, and blue input video channels (RGB) at each pixel (i,k). Preferably, a Sobel operator is used at each pixel of interest to calculate a measure of local red, green, and blue channel video signal variation. The Sobel filter mask is preferred in the present invention although other filters can be used as well such as, for example, a Roberts filter, a Prewitt filter, a Frei-Chen filter, or any other suitable filter.

Preferably, the activity estimator circuit 32 applies a Sobel filter S=[0.5 0 −0.5]' to all three video separations independently in both the vertical and horizontal image directions. For each video separation of red, green and blue channel, and at each pixel (i,k) the norm of the vertical and horizontal components is calculated by the activity estimator circuit 32 as a measure of the local variation or activity at each red, green, and blue channel pixel of interest R(i,k), G(i,k), and B(i,k), respectively. Preferably, the norm is calculated in each color channel as $\sqrt{(S_x^2 + S_y^2)}$ where $S_x$ and $S_y$ represent the Sobel operator applied at the pixel of interest in horizontal and vertical input image directions. Although the above calculation is preferred, the norm of the vertical and horizontal components can be resolved using other suitable normalization approaches and/or techniques or combination of approaches and/or techniques. Further, it may be preferred in some cases to merely approximate the norm of the image horizontal and vertical components.

According to the above, therefore, the activity estimator circuit 32 generates a red channel Sobel activity estimate $R_s(i,k)$ for the red video channel for storage in a buffer 50. Similarly, green and blue channel Sobel activity estimates $G_s(i,k)$, $B_s(i,k)$ are generated and stored in a corresponding set of buffers 52, 54. Essentially, each of the red, green, and blue channel Sobel activity estimates provide a relatively simple and inexpensive measurement of the local pixel level variation of the video signal in each of the three channels.

The comparator circuit 34 shown in FIG. 2 is used in accordance with the preferred embodiment of the invention to generate, based on the red, green, and blue channel activity estimates, a set of channel binary maps in a corresponding set of red, green, and blue channel buffers 56, 58, 60 adapted to store the binary values. Essentially, three binary channels are formed, one for each color separation in RGB space. A red channel binary map $R_{sb}(i,k)$ is sized in correspondence with the red channel activity estimate $R_s(i,k)$ so that there is a one-to-one pixel correspondence therebetween. Each pixel location in the red channel activity estimate group has a corresponding pixel location in the red channel binary map. Similarly, each of the green and blue channel binary maps $G_{sb}(i,k)$, $B_{sb}(i,k)$ are of the same pixel dimension as the green and blue channel activity estimates $G_s(i,k)$, $B_s(i,k)$ so that there is a one-to-one correspondence therebetween as well.

The red, green, and blue channel binary maps are used to store markers that indicate whether the Sobel norm for each pixel within each of the red, green, and blue channels is larger than the Sobel norm of the other pixels in the other channels. The stored markers are preferably logic level values. Namely, a logical "1" is stored when the pixel in a first channel (e.g. green channel) has a Sobel norm greater than the Sobel norm of the corresponding pixels in the remaining channels (e.g. red and blue channels). A logical "0" is stored when a pixel in a channel (e.g. red and blue channels) has a Sobel norm that is less than the Sobel norm of any one of the corresponding pixels in the remaining channels (e.g. green channel). Mathematically, this is expressed as $R_{sb}(i,k)+G_{sb}(i,k)+B_{sb}(i,k)=1$.

Further to the above and in accordance with the invention, in order to ensure that only one binary channel is marked with a logical "1" at each pixel location (i,k), preference is given first to the green channel, and then to the red channel. Essentially, the comparator circuit 34 executes the following logical evaluation:

if $(G_s \geq R_s \&\& G_s \geq B_s)$
   $G_{sb}=1$
else if $(R_s \geq B_s)$
   $R_{sb}=1$
else
   $B_{sb}=1$.

Other logical evaluation schemes can be used as well, such as, for example, the logical evaluation convention can give preference to the red or blue channels. In images other than RGB images, other suitable criteria can be used to execute the logical evaluation in order to ensure that only one binary channel is marked with a logical "y" at each pixel location (i,k).

One important constraint in generating the context sensitive adaptive weighting vector 42 of the invention is to limit the rate of change of the vector. A quickly changing weighting vector could result in false detection of both text and halftones since the video used for segmentation is a function of both the weighting vector and the RGB video input. Therefore, in order to ensure that only slow changes occur in the values of the adaptive weighting vector, each of the red, green, and blue channel binary map values $R_{sb}$, $G_{sb}$, and $B_{sb}$ stored in their respective buffers 56, 58, 60 are passed through a filter circuit 36 to generate a corresponding set of low pass filtered binary maps $R_{sb1}(i,k)$, $G_{sb1}(i,k)$, and $B_{sb1}(i,k)$ stored in a corresponding set of red, green, and blue channel buffers 62, 64, 66. Preferably, the filter circuit 36 includes a pyramid filter, preferably M×N. However, any suitable low pass filter scheme can be used.

A normalizer circuit 38 is used to normalize the low pass filtered binary maps $R_{sb1}(i,k)$, $G_{sb1}(i,k)$, and $B_{sb1}(i,k)$ stored in the buffers 62, 64, 66 to a unity sum. As noted above, at each pixel location (i,k), only one of the binary channel maps $R_{sb}$, $G_{sb}$ and $B_{sb}$ assumes a logical value "1" (e.g. G(i,k). The remaining binary channel maps for that pixel location (i,k) assume a logical value "0" (e.g. R(i,k), B(i,k)). Accordingly, the sum of the three low pass filter channels at each pixel location is a constant and can be readily calculated. To that end, the normalizer circuit 38 performs the following calculation $R_{sb1}(i,k)+G_{sb1}(i,k)=B_{sb1}(i,k)=(M+1)^2(N+1)^2/16$. This makes normalization simple because the three components are divided by a single constant value. Accordingly, the final weighting vector 42 is derived directly from the result of the normalization executed in the normalizer circuit 38 according to:

$$W(i,k)=[R_{sb1}(i,k)G_{sb1}(i,k)B_{sb1}(i,k)]/((M+1)^2(N+1)^2/16).$$

As a further reduction to the operation executed in the normalizer circuit 38, it is to be noted that once having calculated the normalized values of two of the low pass filtered binary channel values, the third is readily obtainable through simple subtraction. As noted above, the sum of the three binary channels at each pixel point is a constant and known beforehand. Accordingly, as an example, the blue binary filtered channel value at each pixel $B_{sb1}(i,k)$ can be easily calculated by subtracting the red and green low pass filtered binary channels from the constant filter value known beforehand.

Figure 3:
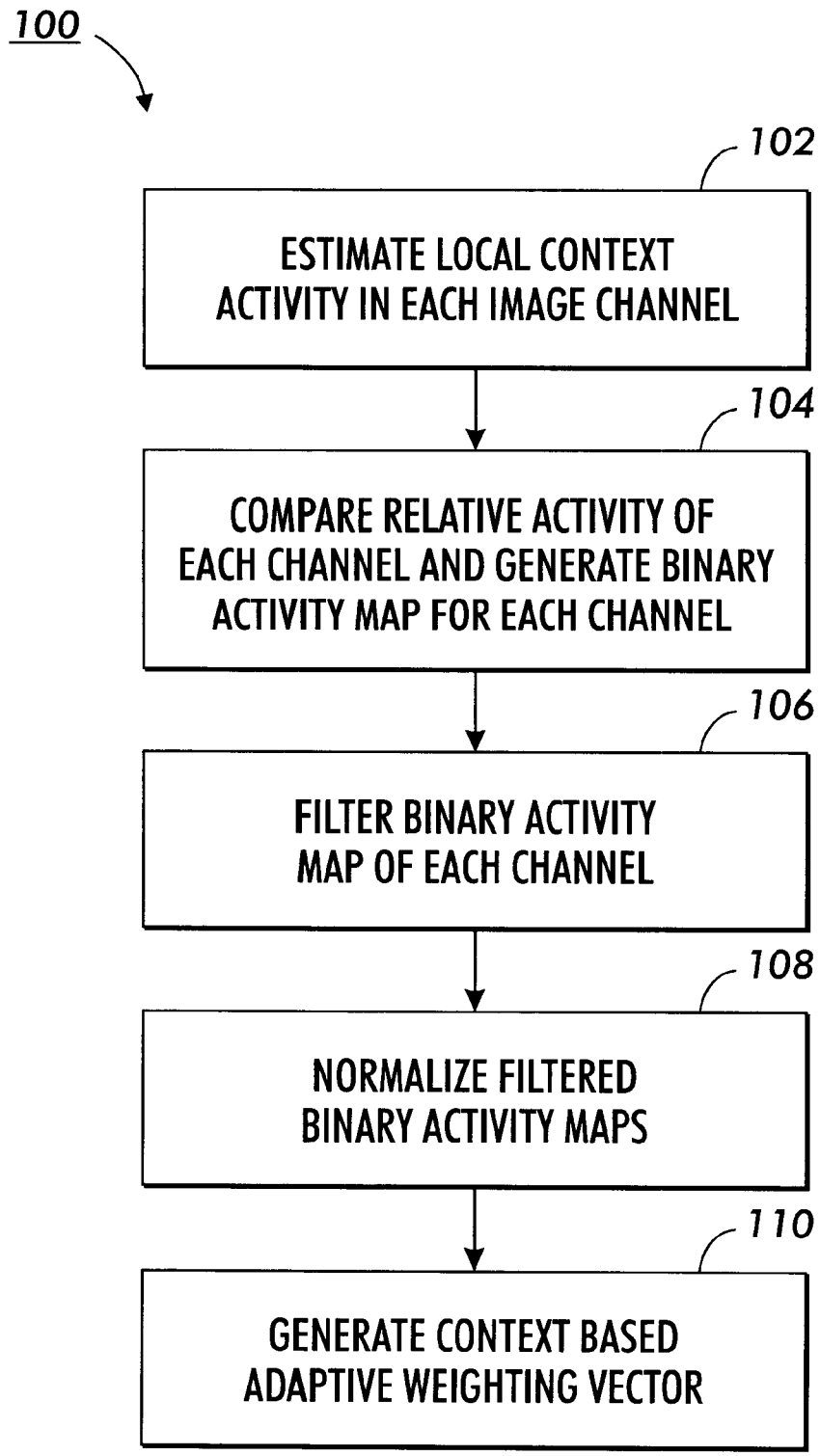

Turning now to FIG. 3, a flow chart is shown illustrating the preferred steps for generating a context based adaptive weighting vector in accordance with the preferred embodiment of the invention. Turning now to that figure, the method 100 includes as a first step, the operation of providing a measurement of the local variation in each of the video channels of the image at each pixel. In that regard, at step 102, an estimate of the local context activity in each image channel is determined. As noted above, in accordance with the present invention, an activity estimator circuit 32 (FIG. 2) is adapted to provide a measurement of the local variation at each pixel in each of the red, green, and blue input video channels using a Sobel operator at each pixel to calculate the local context video channel variation.

Further, the activity estimator circuit 32 generates, at step 102, a Sobel activity estimate for each of the input image channels. In the preferred example, a red, green, and blue channel Sobel activity estimate $R_s(i,k)$, $G_s(i,k)$, and $B_s(i,k)$ is calculated at step 102 using the activity estimator circuit 32 shown in FIG. 2 and in a manner described above.

Next, at step 104, the comparator circuit 34 (FIG. 2) compares the relative activity of each channel and generates a binary activity map $R_{sb}(i,k)$, $G_{sb}(i,k)$, and $B_{sb}(i,k)$ for each channel and essentially declares a "winner" channel and two "loser" channels for each pixel. Preferably, in step 104, red, green, and blue channel binary maps are filled with markers that indicate whether the Sobel norm for each pixel within each of the red, green, and blue channels is larger than the Sobel norm of the other pixels in the other channels. The stored markers are preferably logic level values, namely, a logical "1" when the pixel in a first channel has a Sobel norm greater than the corresponding pixels in the remaining channels and, a logical "0" when a pixel in one channel has a Sobel norm that is less than the Sobel norm of at least one of the corresponding pixels in the remaining channels.

The binary activity map of each channel is filtered at step 106. One important constraint in generating the context sensitive weighting vector of the invention is to limit the rate of change of the vector. A quickly changing weighting vector could result in false detection of both text and halftones since the video used for segmentation is a function of both the weighting vector and the RGB video input.

Therefore, in order to ensure that only slow changes occur in the values of the adaptive weighting vector, each of the red, green, and blue channel binary map values are passed through a filter circuit 36 (FIG. 2) at step 106 to generate a corresponding set of low pass filter binary maps $R_{sb1}(i,k)$, $G_{sb1}(i,k)$, and $B_{sb1}(i,k)$ that are stored in a set of buffer circuits. Preferably, the step of filtering the binary activity map of each channel includes the use of a pyramid filter, preferably a M×N pyramid filter. However, any suitable low pass filter scheme can be used.

The low pass filtered binary maps are normalized at step 108. A normalizer circuit 38 (FIG. 2) is used to normalize the low pass filtered binary maps stored in the buffer circuits to a unity sum. Since only a single pixel at each location in the binary channel maps can assume a logical "1" at any one time, the sum of the low pass filters is a constant and is readily calculated. To that end, the step of normalizing the filtered binary activity map includes performing the following calculation $R_{sb1}(i,k)+G_{sb1}(i,k)+B_{sb1}(i,k)=(M+1)^2(N+1)^2/16$.

Lastly in the preferred method 100 illustrated in FIG. 3, the context based adaptive weighting vector w(i,k) is generated at step 110. Generally, the context based adaptive weighting vector is derived directly from the normalized filtered binary activity maps according to:

$$w(i,k)=[R_{sb1}(i,k)G_{sb1}(i,k)B_{sb1}(i,k)]/((M+1)^2(N+1)^2/16).$$

The resultant content based adaptive weighting vector w(i,k) is applied to each pixel of the input color image to generate a single segmentation channel from the plurality of color separation channels forming the input image. Unlike the fixed weight projection vector of the prior art, the subject adaptive weighting vector of the present invention includes dynamically adjustable weighting parameters that vary as a function of local context activity in the input image. In that way, the subject projection vector always points in a direction in the input image having the greatest level of activity or change. This has the advantage of providing larger signal variation in all types of color images thus enhancing correct detection of halftones and text while improving the overall performance of segmentation.

The invention has been described above in connection with the preferred embodiment. Obviously, modifications and alterations will occur to those of ordinary skill in the art. All such modifications and alterations are included within the scope of the appended claims or any equivalents thereof

Having thus described the preferred embodiment, the invention is now claimed to be:

1. A method of generating a context based adaptive weighting vector for use in single color segmentation of a color image formed of first color channel pixels R(i,k), second color channel pixels G(i,k), and third color channel pixels B(i,k), the method comprising the steps of:

obtaining a first color channel activity estimate $R_s(i,k)$ representation of a measure of local first color channel video signal variation at each first color channel pixel R(i,k) of the color image;

obtaining a second color channel activity estimate $G_s(i,k)$ representation of a measure of local second color channel video signal variation at each second color channel pixel G(i,k) of the color image;

obtaining a third color channel activity estimate $B_s(i,k)$ representation of a measure of local third color channel video signal variation at each third color channel pixel B(i,k) of the color image;

for each pixel (i,k) of the color image, comparing the first color channel activity estimate $R_s(i,k)$ with the second color channel activity estimate $G_s(i,k)$ and with the third color channel activity estimate $B_s(i,k)$ to identify a one of the first, second, and third color channels having greatest activity;

generating a first color channel binary map $R_{sb}(i,k)$ by storing, for each pixel (i,k) of the color image, a first binary value for pixel locations where the first color channel had said greatest activity and a second binary value for pixel locations where the first color channel did not have said greatest activity;

generating a second color channel binary map $G_{sb}(i,k)$ by storing, for each pixel (i,k) of the color image, the first binary value for pixel locations where the second color channel had said greatest activity and the second binary value for pixel locations where the second color channel did not have said greatest activity;

generating a third color channel binary map $B_{sb}(i,k)$ by storing, for each pixel (i,k) of the color image, the first binary value for pixel locations where the third color channel had said greatest activity and the second binary value for pixel locations where the third color channel did not have said greatest activity;

low pass filtering the first color channel binary map $R_{sb}(i,k)$ to generate a first color low pass filtered binary map $R_{sb1}(i,k)$;

low pass filtering the second color channel binary map $G_{sb}(i,k)$ to generate a second color low pass filtered binary map $G_{sb1}(i,k)$;

low pass filtering the third color channel binary map $B_{sb}(i,k)$ to generate a third color low pass filtered binary map $B_{sb1}(i,k)$; and, generating an adaptive weighting vector w(i,k) by combining said first, second, and third color low pass filtered binary maps as w(i,k)=[$R_{sb1}(i,k)$ $G_{sb1}(i,k)$ $B_{sb1}(i,k)$]'.

2. The method of generating a context based adaptive weighting vector according to claim 1 wherein:

the step of obtaining said first color channel activity estimate $R_s(i,k)$ includes obtaining a red channel activity estimate $R_s(i,k)$ representation of a measure of local red channel video signal variation at each red channel pixel R(i,k) of the color image;

the step of obtaining said second color channel activity estimate $G_s(i,k)$ includes obtaining a green channel activity estimate $G_s(i,k)$ representation of a measure of local green channel video signal variation at each green channel pixel G(i,k) of the color image;

the step of obtaining said third color channel activity estimate $B_s(i,k)$ includes to obtaining a blue channel activity estimate $B_s(i,k)$ representation of a measure of local blue channel video signal variation at each blue channel pixel B(i,k) of the color image;

the step of comparing the first color channel activity estimate with the second color channel activity estimate and with the third color channel activity estimate includes comparing said red channel activity estimate $R_s(i,k)$ with said green channel activity estimate $G_s(i,k)$ and with said blue channel activity estimate $B_s(i,k)$ to identify a one of the red, green, and blue channels having greatest activity;

the step of generating said first color channel binary map $R_{sb}(i,k)$ includes generating a red channel binary map $R_{sb}(i,k)$ for storing, for each pixel (i,k) of the color image, said first binary value for pixel locations where said red channel had said greatest activity and said second binary value for pixel locations where said red channel did not have said greatest activity;

the step of generating said second color channel binary map $G_{sb}(i,k)$ includes generating a green channel binary map $G_{sb}(i,k)$ for storing, for each pixel (i,k) of the color image, said first binary value for pixel locations where said green channel had said greatest activity and said second binary value for pixel locations where said green channel did not have said greatest activity;

the step of generating said third color channel binary map $B_{sb}(i,k)$ includes generating a blue channel binary map $B_{sb}(i,k)$ for storing, for each pixel (i,k) of the color image, said first binary value for pixel locations where said blue channel had said greatest activity and said second binary value for pixel locations where said blue channel did not have said greatest activity;

the step of low pass filtering said first color channel binary map includes low pass filtering said red channel binary map $R_{sb}(i,k)$ to generate a red low pass filtered binary map $R_{sb1}(i,k)$;

the step of low pass filtering said second color channel binary map includes low pass filtering said green channel binary map $G_{sb}(i,k)$ to generate a green low pass filtered binary map $G_{sb1}(i,k)$;

the step of low pass filtering said third color channel binary map includes low pass filtering said blue channel binary map $B_{sb}(i,k)$ to generate a blue low pass filtered binary map $B_{sb1}(i,k)$; and, the step of generating said adaptive weighting vector w(i,k) includes generating said adaptive weighting vector w(i,k) by combining said red, green, and blue low pass filtered binary maps as $$w(i,k) = \frac{[R_{sb1}(i,k)\,G_{sb1}(i,k)\,B_{sb1}(i,k)]'}{k}.$$

3. The method of generating a context based adaptive weighting vector according to claim 2 wherein:

the step of obtaining said red channel activity estimate $R_s(i,k)$ includes the step of applying a Sobel filter to each of said red channel pixels R(i,k);

the step of obtaining said green channel activity estimate $G_s(i,k)$ includes the step of applying a Sobel filter to each of said green channel pixels G(i,k); and, the step of obtaining said blue channel activity estimate $B_s(i,k)$ includes the step of applying a Sobel filter to each of said blue channel pixels B(i,k).

4. The method of generating a context based adaptive weighting vector according to claim 3 wherein:

the step of applying said Sobel filter to each of said red channel pixels R(i,k) includes applying said Sobel filter in both vertical and horizontal red channel image directions;

the step of applying said Sobel filter to each of said green channel pixels G(i,k) includes applying said Sobel filter in both vertical and horizontal green channel image directions; and, the step of applying said Sobel filter to each of said blue channel pixels B(i,k) includes applying said Sobel filter in both vertical and horizontal blue channel image directions.

5. The method of generating a context based adaptive weighting vector according to claim 4 wherein:

the step of applying the Sobel filter in both said vertical and horizontal red image directions includes calculating a norm $\sqrt{(S_{x^2}+S_{y^2})}$ of vertical and horizontal image direction components as said red channel activity estimate $R_s(i,k)$;

the step of applying the Sobel filter in both said vertical and horizontal green channel image directions includes calculating a norm $\sqrt{(S_{x^2}+S_{y^2})}$ of vertical and horizontal image direction components as said green channel activity estimate $G_s(i,k)$; and, the step of applying the Sobel filter in both said vertical and horizontal blue channel image directions includes calculating a norm $\sqrt{(S_{x^2}+S_{y^2})}$ of vertical and horizontal image direction components as said blue channel activity estimate $B_s(i,k)$.

6. The method of generating a context based adaptive weighting vector according to claim 2 wherein:

the step of generating said red channel binary map $R_{sb}(i,k)$ includes storing, for each pixel (i,k) of the RGB color image, a logical "1" as said first binary value where the red channel had said greatest activity and storing a logical "0" as said second binary value for pixel locations where the red channel did not have said greatest activity;

the step of generating said green channel binary map $G_{sb}(i,k)$ includes storing, for each pixel (i,k) of the RGB color image, a logical "1" as said first binary value where the green channel had said greatest activity and storing a logical "0" as said second binary value for pixel locations where the green channel did not have said greatest activity; and, the step of generating said blue channel binary map $B_{sb}(i,k)$ includes storing, for each pixel (i,k) of the RGB color image, a logical "1" as said first binary value where the blue channel had said greatest activity and storing a logical "0" as said second binary value for pixel locations where the blue channel did not have said greatest activity.

7. The method of generating a context base adaptive weighting vector according to claim 2 wherein the step of comparing the red channel activity estimate $R_s(i,k)$ with the green channel activity estimate $G_s(i,k)$ and with the blue channel activity estimate $B_s(i,k)$ includes comparing the red channel activity estimate $R_s(i,k)$ with the green channel activity estimate $G_s(i,k)$ and with the blue channel activity estimate $B_s(i,k)$ according to:

if $(G_s \geq R_s\, \&\&\, G_s \geq B_s)$
   $G_{sb}=1$
else if $(R_s \geq B_s)$
   $R_{sb}=1$
else
   $B_{sb}=1$.

8. The method of generating a context based adaptive weighting vector according to claim 2 wherein:

the step of low pass filtering the red channel binary map $R_{sb}(i,k)$ includes low pass filtering the red channel binary map $R_{sb}(i,k)$ using a first M×N low pass pyramidal filter;

the step of low pass filtering the green channel binary map $G_{sb}(i,k)$ includes low pass filtering the green channel binary map $G_{sb}(i,k)$ using said first M×N low pass pyramidal filter; and, the step of low pass filtering the blue channel binary map $B_{sb}(i,k)$ includes low pass filtering the blue channel binary map $B_{sb}(i,k)$ using said first M×N low pass pyramidal filter.

9. The method of generating a context based adaptive weighting vector according to claim 8 wherein the step of low pass filtering the red, green, and blue channel binary maps includes normalizing the red, green, and blue channel binary maps to a unitary sum at each pixel according to:

$$R_{sb1}(i,k)+G_{sb1}(i,k)+B_{sb1}(i,k)=(M+1)^2(N+1)^2/16.$$

10. The method of generating a context based adaptive weighting vector according to claim 9 wherein the step of generating said adaptive weighting vector w(i,k) includes the step of combining said red, green, and blue low pass filter binary maps as:

$$w(i,k)=[R_{sb1}(i,k)\,G_{sb1}(i,k)\,B_{sb1}(i,k)]'/((M+1)^2/(N+1)^2/16).$$

11. A method of generating a context based adapted weighting vector for use in single channel segmentation of an image formed of first channel pixels A(i,k) and second channel pixels B(i,k) the method comprising the steps of:

obtaining activity estimate representations of a measure of local channel signal variation at each first channel pixel as $A_s(i,k)$ and at each second channel pixel as $B_s(i,k)$ of the image;

for each pixel (i,k) of the image, comparing said activity estimate representations to identify a one of a first and second channels having greatest activity;

generating a first channel binary map $A_{sb}(i,k)$ and a second channel binary map $B_{sb}(i,k)$ by storing in each first and second binary maps, for each pixel (i,k) of the color image, a first binary value for pixel locations where the first and second channels had said greatest activity and a second binary value for pixel locations where the channels did not have said greatest activity;

filtering the first channel binary map $A_{sb}(i,k)$ and the second channel binary map $B_{sb}(i,k)$ to generate a first filtered binary map $A_{sb1}(i,k)$ and a second filtered binary map $B_{b1}(i,k)$; and, generating an adaptive weighting vector w(i,k) by combining said first and second filtered binary maps as $$w(i, k) = \frac{[A_{sb1}(i, k) B_{sb1}(i, k)]'}{k}.$$

12. The method of generating a context based adaptive weighting vector according to claim 11 wherein the step of obtaining said first channel activity estimate $A_s(i,k)$ and said second channel activity estimate $B_s(i,k)$ includes the step of applying a Sobel filter to each of said first channel pixels A(i,k) and said second channel pixels B(i,k) in both vertical and horizontal channel directions to calculate a norm at each pixel in each said first and second channels.

13. The method of generating a context based adaptive weighting vector according to claim 11 wherein the step of filtering said first channel binary map $A_{sb}(i,k)$ and said second channel binary map $B_{sb}(i,k)$ includes the step of low pass filtering the first and second channel binary maps using a low pass M×N pyramidal filter.

14. The method of generating a context based adaptive weighting vector according to claim 13 wherein the step of low pass filtering the first and second channel binary maps includes normalizing the first and second channel binary maps to a unity sum at each pixel according to:

$A_{sb1}(i,k)+B_{sb1}(i,k)=(M+1)^2(N+1)^2/k.$

15. The method generating a context based adaptive weighting vector according to claim 14 wherein the step of generating said adaptive weighting vector w(i,k) includes the step of combining said first and second low pass filter binary maps as:

$w(i,k)=[A_{sb1}(i,k)B_{sb1}(i,k)]'/((M+1)^2/(N+1)^2/k).$

16. An apparatus of generating a context based adapted weighting vector for use in single channel segmentation of an image formed of first channel pixels A(i,k) and second channel pixels B(i,k), the apparatus comprising:

an activity estimator circuit for obtaining activity estimate representations of a measure of local channel signal variation at each first channel pixel as $A_s(i,k)$ and at each second channel pixel as $B_s(i,k)$ of the image;

a comparator circuit for comparing, for each pixel (i,k) of the image, comparing said activity estimate representations to identify a one of a first and second channels having greatest activity and generating a first channel binary map $A_{sb}(i,k)$ and a second channel binary map $B_{sb}(i,k)$ by storing in each first and second binary maps, for each pixel (i,k) of the color image, a first binary value for pixel locations where the first and second channels had said greatest activity and a second binary value for pixel locations where the channels did not have said greatest activity;

a filter circuit for filtering the first channel binary map $A_{sb}(i,k)$ and the second channel binary map $B_{sb}(i,k)$ to generate a first filtered binary map $A_{sb1}(i,k)$ and a second filtered binary map $B_{b1}(i,k)$; and, a normalizer circuit for generating an adaptive weighting vector w(i,k) by combining said first and second filtered binary maps as $$w(i, k) = \frac{[A_{sb1}(i, k) B_{sb1}(i, k)]'}{k}.$$

17. The apparatus according to claim 16 wherein the activity estimator circuit includes a circuit for applying a Sobel filter to each of said first channel pixel A(i,k) and said second channel pixels B(i,k) in both vertical and horizontal first and second channel directions to calculate a norm at each pixel in each said first and second channels.

18. The apparatus according to claim 16 wherein the filter circuit includes a circuit for low pass filtering the first and second channel binary maps using a first low pass M×N pyramidal filter.

19. The apparatus according to claim 18 wherein the normalizer circuit includes a circuit for normalizing the first and second channel binary maps to a unity sum at each pixel according to:

$A_{sb1}(i,k)+B_{sb1}(i,k)=$ $(M+1)^2(N+1)^2/k.$

20. The apparatus according to claim 19 wherein the normalizer circuit includes a circuit for combining said first and second low pass filter binary maps as:

$w(i,k)=[A_{sb1}(i,k)$ $B_{sb1}(i,k)]'/((M+1)^2/)N$ $+1)^2/k).$

* * * * *